United States Patent
Rikli et al.

(10) Patent No.: US 6,602,019 B1
(45) Date of Patent: Aug. 5, 2003

(54) DEVICE FOR FIXING, TENSIONING OR PULLING AN EXTENSIBLE TRACTION ELEMENT, IN PARTICULAR, A CABLE

(76) Inventors: Christian Rikli, Reidstrasse 50A, Húnibach (CH); Fritz Feuz, Rúhistrasse 5, Ch-Thun (CH)

( * ) Notice: Subject to any disclaimer, the term of this patent is extended or adjusted under 35 U.S.C. 154(b) by 0 days.

(21) Appl. No.: 09/701,629

(22) PCT Filed: Mar. 24, 2000

(86) PCT No.: PCT/CH00/00177

§ 371 (c)(1),
(2), (4) Date: Mar. 2, 2001

(87) PCT Pub. No.: WO00/60253

PCT Pub. Date: Oct. 12, 2000

(30) Foreign Application Priority Data

Apr. 1, 1999 (CH) .................................. 624/99

(51) Int. Cl.[7] .............................. B66F 1/00; F16B 2/00
(52) U.S. Cl. ................ 403/374.1; 254/106; 403/374.2; 24/136 R
(58) Field of Search ...................... 254/106; 24/136 R; 403/206, 369, 368, 374.1, 374.2

(56) References Cited

U.S. PATENT DOCUMENTS

| | | | | |
|---|---|---|---|---|
| 749,896 A | * | 1/1904 | Brown ..................... 24/136 R |
| 944,141 A | * | 12/1909 | Mounts .................... 24/136 R |
| 1,208,458 A | * | 12/1916 | Benjamins ................. 254/106 |
| 1,307,653 A | * | 6/1919 | Benjamins ................. 254/106 |
| 1,637,270 A | * | 7/1927 | Neely ........................ 294/90 |
| 1,703,777 A | * | 2/1929 | Pernot ................... 403/206 X |
| 1,945,438 A | * | 1/1934 | Landahl .................. 24/136 R |
| 2,245,316 A | * | 6/1941 | Amsler .................. 403/368 X |
| 2,755,093 A | * | 7/1956 | Peter et al. ............ 403/369 X |
| 4,427,180 A | * | 1/1984 | Brieuc ...................... 254/106 |
| 4,572,565 A | * | 2/1986 | Epstein .................. 24/136 R |
| 4,643,609 A | | 2/1987 | Biass |
| 4,872,626 A | * | 10/1989 | Lienart ................... 24/136 R |
| 4,936,710 A | * | 6/1990 | Petty et al. ............... 405/224 |

FOREIGN PATENT DOCUMENTS

FR  2685406  6/1993

* cited by examiner

Primary Examiner—Lynne H. Browne
Assistant Examiner—Ernesto Garcia
(74) Attorney, Agent, or Firm—Browdy and Neimark, P.L.L.C.

(57) ABSTRACT

The device has two supports (15, 16) which can be moved in relation to each other in a transverse direction to the axis (2) of the traction element (1). Several clamping jaws (19, 20) are displaceably mounted in pairs opposite each other on said supports. The clamping jaws (19, 20) have surfaces which grasp the traction element (1). When strain is placed on the traction element, the clamping jaws are displaced linearly at increasing distances except for the rear pair, in such a way that the clamping force can be evenly distributed over a great length, despite the extension of the traction element (1). This allows, for example, steel cables with a high traction force to be tensioned without damaging the cable.

20 Claims, 3 Drawing Sheets

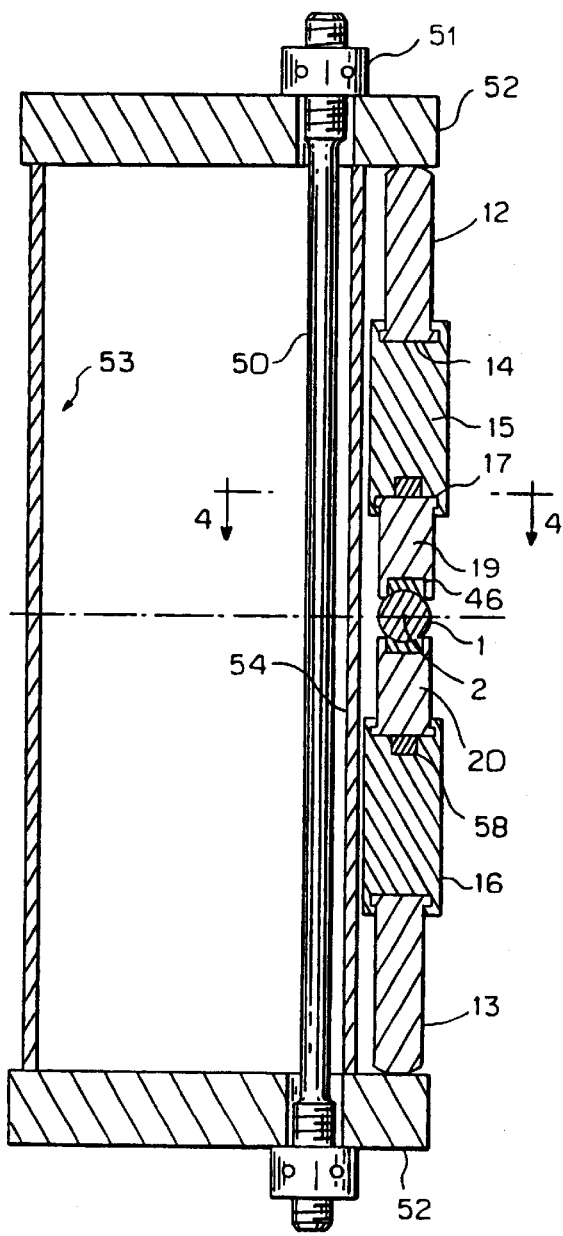
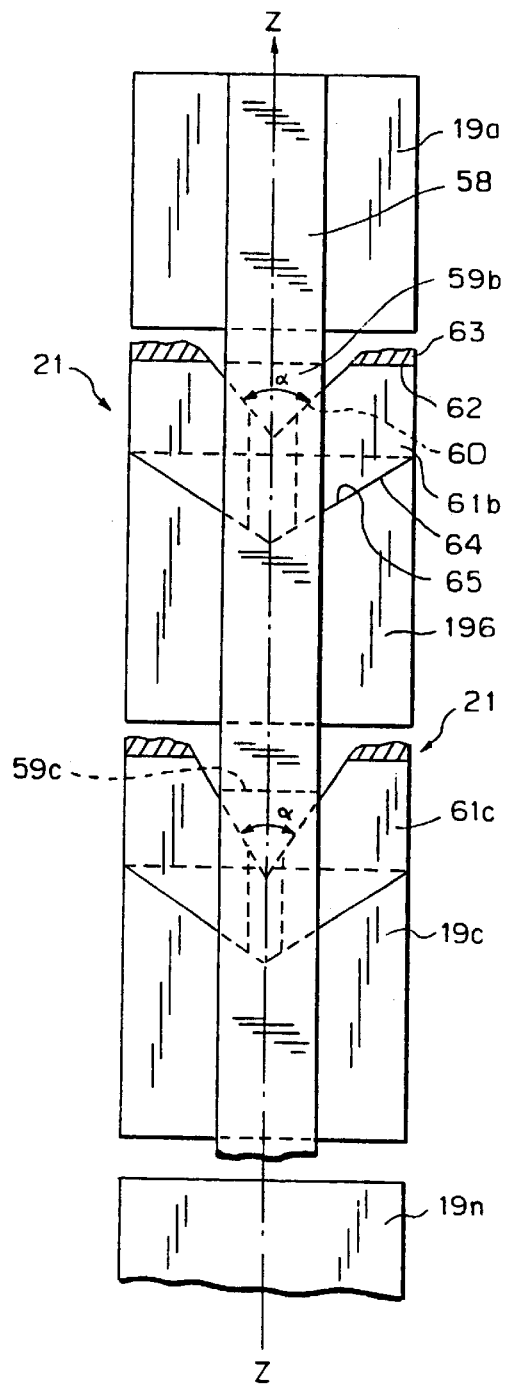

DEVICE FOR FIXING, TENSIONING OR PULLING AN EXTENSIBLE TRACTION ELEMENT, IN PARTICULAR, A CABLE

The present application is the national stage under 35 U.S.C. §371 of International Appln. PCT/CH00/00177 which designated the United States, and was not published in English.

BACKGROUND OF THE INVENTION

1. Technical Field of the Invention

The invention is directed to a device for fixing, tensioning or pulling an extendable traction element, in particular a cable.

2. Prior Art

Besides grouting heads, clamp heads and bollards, for end fixtures or intermediate fixtures of steel cables also so-called cable clamps are used. The necessary gripping force is produced by clamp jaws which are pressed against the cable with e.g. bolts, springs or wedges. This solution is suitable for relatively small forces where the cable elongation over the clamp length during the tension build-up is negligible. For the tensioning of thicker cables with elevated traction forces, however, the clamps known at present are less suitable, as they can damage the cable and harbour some uncertainties in the frictional force transmission.

OBJECT OF THE INVENTION

The object of the present invention is to provide a device with which extensible traction elements can be tensioned, fastened and pulled without damage.

BRIEF DESCRIPTION OF THE DRAWINGS

In the following figures an embodiment of the invention is shown:

FIG. 3 is a cross section through a second embodiment and

FIG. 4 is a detail of the stroke limitation of the jaws.

DESCRIPTION OF PREFERRED EMBODIMENTS

The device serves to fix, tension or pull a longitudinally elastic or extensible traction element. A favoured field of application is the tensioning of steel cables for suspended structures, e.g. for suspended large-area roofs. Here the tensioned length of the cable plays a great role in its function and form stability. New cables have the unfortunate tendency to grow in length during the first few weeks of being put under load. The unpleasant result of this elongation is that after being put into service the freshly built suspended structure must be closed again for a few weeks in order to re-tension the cables.

This shut-down shortly after opening a plant, and subsequently also when installing cables in need of periodic renewal, is of course inconvenient for the operators of such plants. Under some circumstances a re-tensioning is no longer possible after installation. Similar problems arise with the carrier cables of suspended bridges and suspended railways, where cables must likewise be re-tensioned, shifted and periodically renewed. Also, other traction elements such as tie-rods, belts or plastic ropes are difficult to tension for high loads without damaging them.

On applying the tractive force using clamping jaws, the traction element slips, starting from the tractive side of the traction element, as the frictional adhesion is overcome, until it grips over the whole length of the clamping jaw. In practice, however, it is not determinable how much force is transmitted per unit length. If the clamping jaw material is hard, at least the surface of the traction elements will be damaged. If the material is soft, it will be rubbed off at least on the side facing the drawn cable.

Figure 1:
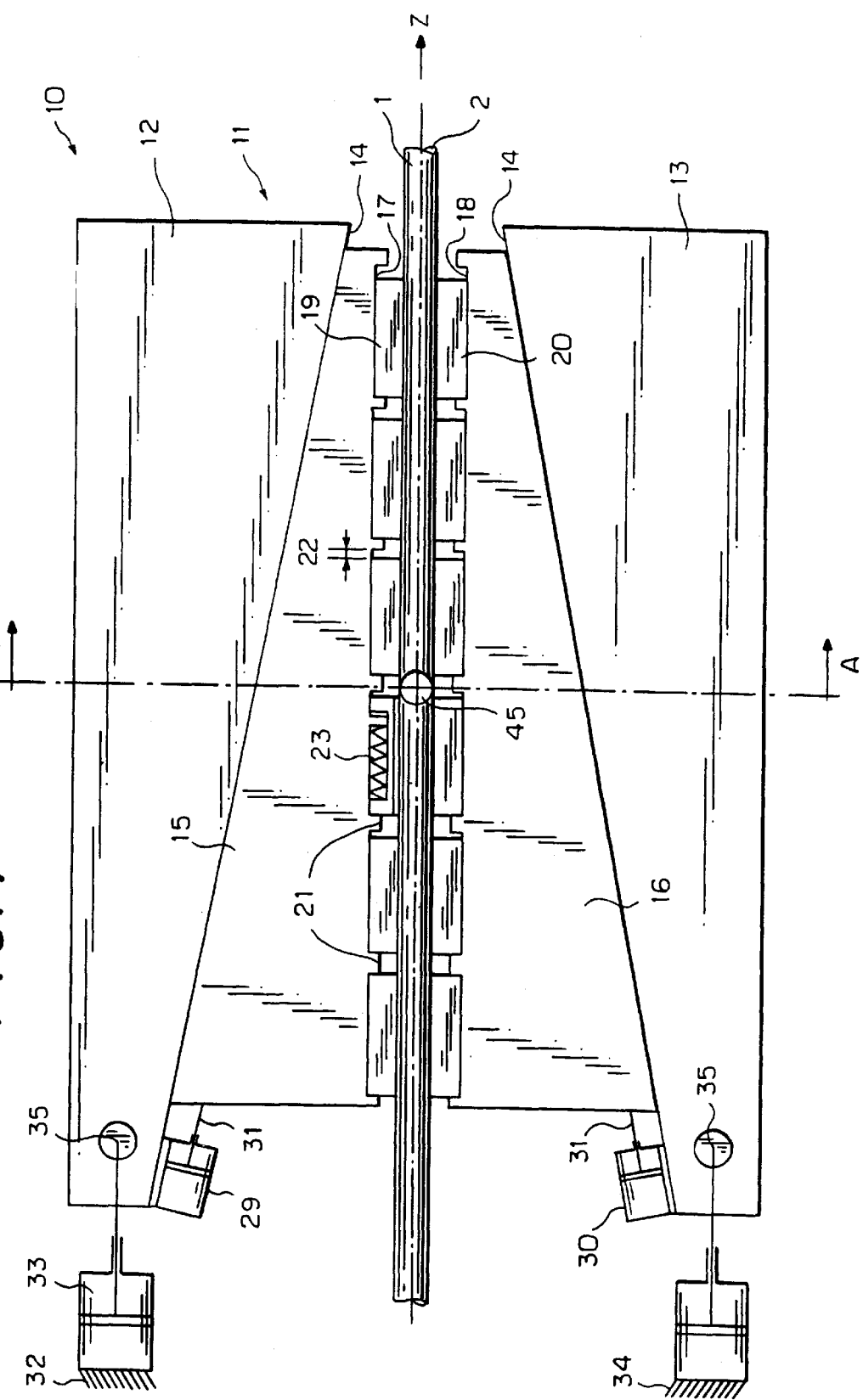
FIG. 1 a side view of the device according to the invention.

The embodiment described hereinafter avoids these deficiencies. Acting on a steel cable 1 with axis 2 is a tractive force in the axial direction Z. The cable is clamped in the device 10. The device 10 has a frame 11 with two frame parts 12, 13 arranged symmetrically about the axis 2. The components 12, 13 have mutually facing wedge surfaces 14 converging in the direction of traction Z. Sliding on the surfaces 14 are two mutually opposing wedges 15, 16. These save rectilinear mutually facing slide surfaces 17, 18, e.g. in the form of dovetail guideways, on each of which a row of clamping jaws 19, 20 are displaceably located. Except for the rearmost jaw pair viewed in the direction of traction Z, the clamping jaws are displaceable out of their basic position shown in FIG. 1 by an amount limited by stops 21 formed on slide surfaces 17, 18 in the direction of traction Z. The possible amount of displacement 22 of the jaws 19, 20 out of their basic position increases linearly in the direction of traction Z. It is adjustable in order to adapt the device 10 to cables 1 of different moduli of elasticity (for steel cables between about 70,000 and 160,000 N/mm2). The jaws 19, 20 all have the same length. They are attached interchangeably on the slide surfaces 17, 18 in order to adapt the device 10 to other cross-sections of the cable 1 or other traction elements. The jaws 19 are restored to their basic position by springs 23.

Fitted to the frame 11 are two hydraulic cylinders 29, 30, the pistons 31 of which are attached to the wedges 15, 16 and actuate these latter.

Two further hydraulic cylinders 33, 34 anchored in a foundation 32 pull the frame 11 in the opposite direction to the traction Z via non-depicted drawbars and transverse bolts 35, which latter are stuck through the components 12, 13.

Figure 2:
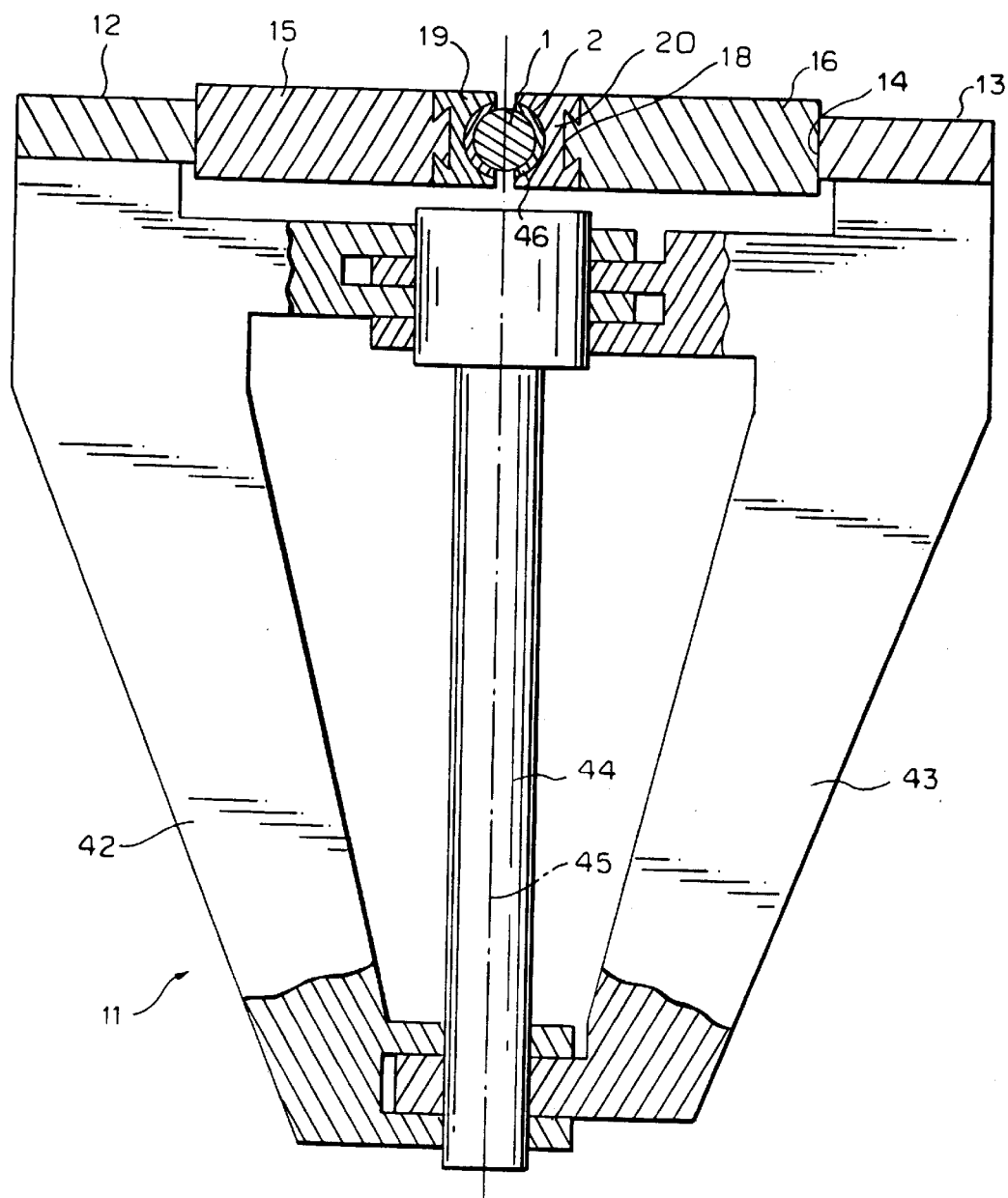
FIG. 2 is a cross-section along section A—A of FIG. 1.

As shown in FIG. 2, the two frame components 12, 13 are pivotably connected together on one side of the cable only. In the simplified representation the connection is via connecting parts 42, 43 fixed to the components 12, 13 and a shaft 44, the axis 45 of which intersects the axis 2 at right angles roughly in the longitudinal center of the row of jaws 19, 20.

It is thus achieved that under linearly increasing elongation of the cable 1 in the direction of traction Z and hence approximately linear reduction in cable diameter, the same radial force nevertheless acts on the cable 1 over the entire length of the row of jaws 19, 20. This effect can, however, also be approximately achieved without pivot action, but instead with relatively long strain bolts which press the components 12, 13 towards each other.

The clamping jaws 19, 20 have semi-cylindrical recesses with inserts 46 of a material which is softer than the traction element to be tensioned or fastened. For steel cables 1, suitable "soft"materials for the inserts 46 are e.g. bearing metal, tin, plastic etc. With the contact pressure between clamping jaw 19, 20 and the cable 1 equal to that between the jaw 19, 20 and slide surface 17, 18, the adhesion between the jaw 19, 20 and the cable 1 is greater than that between the jaw 19, 20 and slide surface 17, 18. Depending on the nature of the surface of traction element 1 and the material selected for the inserts 46, "adhesion" means either a frictional grip (smooth cable surface) or an at least partial positive grip (rough surface with impressions in the inserts 46).

To apply tension, the cable 1 is placed between the jaw pairs 19, 20 from the side, and the wedges 15, 16 applied via the cylinders 29, 30. Then the cylinders 33, 34 are actuated. The rearmost, fixed, jaw pair 19, 20 relative to the direction of traction Z, pull (together with the other jaws) the cable 1 up to the limit of their frictional adhesion with the slide surfaces 17, 18, thereby elongating the cable 1. Due to the elongation increasing from the rear to the front, the front clamping jaws 19, 20 slip first and then immediately afterwards the others. The graduation of the stroke limits 22 is designed such that all jaws 19, 20 bear against their stops 21 when the specified tensioning force for the cable 1 has been attained via the cylinders 33, 34. Thereby the very strong force to be applied especially to thick cables can be transmitted to the cable over a great length in spite of the cable elongation, which due to the damage to the cable caused by slip or crushing was as yet not possible with conventional tensioning clamp devices.

This offers the opportunity e.g. to pre-stretch steel cables for suspended structures prior to installation, so that shut-downs for re-tensioning shortly after installation can be largely avoided. When the device 10 is employed for fixing a traction element 1, the tensioning cylinders 33, 34 can be omitted and the frame 11 anchored directly. The cylinders 29, 30 are only needed for installation purposes in this case. The device is also suitable for the continuous dragging of extensible traction elements 1 by rigging two of these devices 10 one behind the other and performing intermittent drag steps alternating.

The abutments or stops 21 of the displacements of the clamping jaws 19, 20 in the direction of traction Z is not absolutely necessary, but convenient, so that when the diameter of the cable 1 varies along the clamped length the tractive force is nevertheless roughly evenly distributed over the clamped length.

Instead of via the wedge surfaces 14, the radial pressing of the supports 15, 16 can also be applied via cylinders arranged radially to the axis 2, or via a parallelogram linkage, the dead point of which is close to the maximum clamped length of the cable 1. Like the wedges 15, 16, such parallelogram linkages can also be connected together on components 12, 13, which are pivotable relative to each other about the axis 45. The pivot facility about the axis 45 is not absolutely necessary, however. If, e.g. a pre-loading via stain bolts acts on the components 12, 13, the pre-elongation of the bolts (several mm) is quite adequate to compensate for the diameter reduction of the cable 1, in order to attain a uniform force distribution.

FIG. 3 shows the embodiment in which the two frame components 12+13 are not pivotable, but are rigidly connected together by strain bolts 50. The strain bolts 50 bear on plates 52, which are held apart by a row of rectangular pipes 53. The strain bolts 50 are located immediately alongside the side wall 54 of the pipes 53 directed towards the axis 2. Due to the eccentric loading of the pipes 53 by the strain bolts 50, the pipes bend slightly. When the cable is tensioned, the frame components 12, 13 are forced apart by the wedges 15, 16. Due to the elastic pre-elongation of the strain bolts 50, which amounts to several times the difference between the diameter of the cable 1 in its tensioned and non-tensioned states, the radial pressure of the jaws 19, 20 on the cable 1 is distributed roughly evenly over the whole clamping length in spite of the diameter diminishing with increasing tensile stress.

FIG. 4 depicts diagrammatically along section IV—IV of FIG. 3 a device for the automatic adjustment of the stops 21 for the displacement of the clamping jaws 19, 20. The wedge (or support) 15 is omitted in FIG. 4 for reasons of clarity. Firmly bolted to the foremost clamping jaw 19a with reference to the direction of traction Z is a control rod 58. The rearmost jaws 19, 20 (or the last two or three rear jaws) are attached rigidly to the wedges 15, 16. At every jaw 19 except the rearmost and foremost a triangular control piece 59 projects from the control rod 58 towards the axis 2. As shown in FIG. 4, the wedge angles α of the control pieces 59b, 59c diminish with increasing distance from the front jaw 19a. Abutting against the two flanks 60 of the control pieces 59b, 59c is one stop piece 61b, 61c each. The stop pieces 61b, 61c abut against surfaces 62 of stops 63 rigidly connected to the relevant wedge 15. The surfaces 62 are perpendicular to the axis 2. On the side of every stop piece 61b, 61c opposite the flanks 60 and inclined to the axis 2 is a wedge-shaped surface 64, which mates with a corresponding counterpart surface 65 of the relevant jaw 19b, 19c. By way of non-depicted springs, the control rod 58 is pre-loaded counter to the direction of traction Z to the basic position shown in FIG. 4, in which the stop pieces 61b, 61c bear with their front and rear faces against the flanks 60, the surface 62 and the counterpart surface 65.

When the cable 1 is now pulled in the direction Z, the foremost jaw 19a moves further away from the rearmost jaw 19 n due to the cable elongation, taking the rod 58 with it. The control pieces 59b, 59c thereby move away from the stop pieces 61b, 61c. Since the following jaws 19b and 19c are likewise put under load by tension Z, they push via the wedge surfaces 65 the opposing stop pieces 61b, 61c towards each other until they once more rest against control pieces 59b, 59c . As the wedge angle α diminishes with increasing distance from the foremost jaw 19a, the displacement of the stop pieces 61b, 61c towards each other also diminishes with increasing distance. The angles ax are so selected that the displacement stroke limited by stops 21 is subject to a linear increase starting from the rearmost jaw pair 19n. On relieving the tension on the cable 1, the spring pulls the control rod 58 back to the basic position, and the control pieces 59b, 59c drive the opposing stop pieces 61 apart again into the basic positions accordingly. The chief advantage of the automatic stop setting described is that a uniform traction force distribution among the individual jaw pairs is achieved without having to previously determine the modulus of elasticity of the cable 1. The same device can be employed for various kinds of cable without modification.

What is claimed is:
1. Device for fixing, tensioning or pulling an extensible traction element (1), comprising
   supports (15, 16) movable toward each other transverse to a longitudinal axis (2) of the traction element (1),
   a plurality of pairs of clamping jaws (19, 20) arranged mutually opposite on the supports (15, 16) one behind another in a direction of the axis (2) of the traction element (1) whereby two adjacent pairs of said clamping jaws (19,20) are spaced an initial distance from one another,
   said clamping jaws (19,20) having engagement surfaces for engaging the traction element (1) along a substantial length of said clamping jaws in said direction of said axis (2), and wherein said clamping jaws (19,20) are adapted to tightly grip the traction element (1) to prevent substantial axial movement of the traction element (1) relative to the clamping jaws (19,20), a majority of the clamping jaws (19, 20) being displaceable in the direction of the axis (2) from a basic position on the supports (15, 16) away from a rearmost pair of said clamping jaws (19,20), and wherein in operation under load of the traction element (1) and consequent elongation of the traction element (1), adjacent pairs of said clamping jaws (19,20) move away from one another in the direction of said axis (2) so that a second distance between said two adjacent pairs of said clamping jaws (19,20) after said elongation becomes greater than said initial distance.

2. The device according to claim 1, wherein a difference between said initial distance and said second distance for a majority of the displaceable clamping jaws (19, 20) increases with an increasing distance from the rearmost pair of clamping jaws.

3. The device according to claim 1, wherein the clamping jaws (19, 20) are displaceable on surfaces (17, 18) of the supports (15, 16) which are substantially parallel to the axis (2) of the traction element (1).

4. A device according to claim 1 further comprising a frame (11), wherein each support comprises a wedge (15, 16), and two opposite lying wedges (15, 16) are displaceable on opposing and converging wedge surfaces (14) of said frame (11).

5. The device according to claim 4, wherein the frame (11) comprises two components (12, 13; 52) which, in operation under load of the traction element (1), are movable relative to each other transverse to the axis (2) of the traction element (1) over at least part of their length in the direction of the axis (2).

6. The device according to claim 4, wherein the frame (11) is open to one side thereof at right angles to the axis (2) of the traction element (1) over an entire length of the frame (11) in the direction of the axis (2) for introducing the traction element (1) into or removing said traction element (1) out of the device from or to said one side.

7. The device according to claim of 2, wherein said difference between initial and second distance of the clamping jaws (19, 20) from a basic position to a corresponding top (21) is adjustable.

8. The device according to claim 1, further comprising means (58–65) for adjusting movement limits for the displaceable clamping jaws (19, 20).

9. The device according to claim 8, wherein adjustment of the movement limits is controlled by displacement motion of a foremost pair of said clamping jaws.

10. The device according to claim 2, wherein the clamping jaws (19, 20) are displaceable on surfaces (17, 18) which are substantially parallel to the axis (2) of the traction element (1).

11. Device for fixing, tensioning or pulling an extensible traction element (1), comprising supports (15, 16) movable toward each other transverse to a longitudinal axis (2) of the traction element (1), a plurality of pairs of displaceable clamping jaws (19, 20) arranged mutually opposite on the supports (15, 16) one behind another in a direction of the axis (2) of the traction element (1), a rearmost pair of fixed clamping jaws, said displaceable clamping jaws (19, 20) and said rearmost pair of fixed clamping jaws having engagement surfaces for engaging the traction element (1) along a substantial length of said clamping jaws in said direction of said axis (2), and wherein said displaceable clamping jaws (19, 20) and said rearmost pair of fixed clamping jaws are adapted to tightly grip the traction element (1) to substantially prevent axial movement of the traction element (1) relative to the clamping jaws, wherein the displaceable clamping jaws (19, 20) are displaceable in the direction of the axis (2) from a basic position on the supports (15, 16) away from said rearmost pair of fixed clamping jaws (19, 20), and wherein in operation under load of the traction element (1) and consequent elongation of the traction element (1), each pair of said displaceable clamping jaws (19, 20) moves away from said rearmost pair of fixed clamping jaws and from any pair of displaceable clamping jaws (19, 20) in between, while said pairs of displaceable clamping jaws (19,20) continue to tightly grip the traction element (1).

12. Device for fixing, tensioning or pulling an extensible traction element (1), comprising supports (15, 16) movable toward each other transverse to a longitudinal axis (2) of the traction element (1), a plurality of pairs of displaceable clamping jaws (19, 20) arranged mutually opposite on the supports (15, 16) one behind another in a direction of the axis (2) of the traction element (1), a rearmost pair of fixed clamping jaws, said displaceable clamping jaws (19, 20) and said rearmost pair of fixed clamping jaws having engagement surfaces for engaging the traction element (1) along a substantial length of said clamping jaws in said direction of said axis (2), and wherein said displaceable clamping jaws (19, 20) and said rearmost pair of fixed clamping jaws are adapted to tightly grip the traction element (1) to substantially prevent axial movement of the traction element (1) relative to the clamping jaws, wherein the displaceable clamping jaws (19, 20) are displaceable in the direction of the axis (2) from a basic position on the supports (15, 16) away from said rearmost pair of fixed clamping jaws (19, 20), wherein in operation under load of the traction element (1) and consequent elongation of the traction element (1), each pair of said displaceable clamping jaws (19, 20) moves away from said rearmost pair of fixed clamping jaws and from any pair of displaceable clamping jaws (19, 20) in between, while said pairs of displaceable clamping jaws (19, 20) continue to tightly grip the traction element (1), and wherein a maximum displacement stroke (22) of each displaceable clamping jaw (19, 20) is larger than the maximum displacement stroke (22) of any preceding displaceable clamping jaw (19, 20) closer to the rearmost pair of clamping jaws.

13. A device for fixing, tensioning or pulling an extensible traction element (1), comprising supports (15, 16) movable toward each other transverse to a longitudinal axis (2) of the traction element (1), a plurality of pairs of displaceable clamping jaws (19, 20) arranged mutually opposite on the supports (15, 16) one behind another in a direction of the axis (2) of the traction element (1), a rearmost pair of fixed clamping jaws, said displaceable clamping jaws (19, 20) and said rearmost pair of fixed clamping jaws having engagement surfaces for engaging the traction element (1) along a substantial length of said clamping jaws in said direction of said axis (2), and wherein said displaceable clamping jaws (19, 20) and said rearmost pair of fixed clamping jaws are adapted to tightly grip the traction element (1) to substantially prevent axial movement of the traction element (1) relative to the clamping jaws, wherein the displaceable clamping jaws (19, 20) are displaceable in the direction of the axis (2) from a basic position on the supports (15, 16) away from said rearmost pair of fixed clamping jaws (19, 20), wherein in operation under load of the traction element (1) and consequent elongation of the traction element (1), each pair of said displaceable clamping jaws (19, 20) moves away from said rearmost pair of fixed clamping jaws and from any pair of displaceable clamping jaws (19, 20) in between, while said pairs of displaceable clamping jaws (19, 20) continue to tightly grip the traction element (1), and wherein the displaceable clamping jaws (19, 20) are displaceable on surfaces (17, 18) of the supports (15, 26) which are substantially parallel to the axis (2) of the traction element (1).

14. The device according to claim 11 further comprising a frame (11), wherein each support comprises a wedge (15, 16) and two opposite lying wedges (15, 16) are displaceable on opposing and converging wedge surfaces (14) of the frame (11).

15. The device according to claim 14, wherein the frame (11) comprises two components (12, 13; 52) which, in operation under load of the traction element (1), are movable relative to each other transverse to the axis (2) of the traction element (1) over at least part of their length in the direction of the axis (2).

16. The device according to claim 14, wherein the frame (11) is open to one side of the frame at right angles to the axis (2) of the traction element (1) over an entire length of the frame (11) in the direction of the axis (2) for introducing the traction element (1) into or removing the traction element out of the device from or to said one side.

17. The device according to claim 12, wherein the displacement stroke (22) of the clamping jaws (19, 20) from a basic position to a corresponding stop (21) is adjustable.

18. The device according to claim 11, further comprising means (58–65) for adjusting stroke limits for the displaceable clamping jaws (19, 20).

19. The device according to claim 18, wherein adjustment of the stroke limits is controlled by displacement motion of a foremost pair of clamping jaws.

20. The device according to claim 12, wherein the displaceable clamping jaws (19, 20) are displaceable on surfaces (17, 18) of the supports (15, 16) which are substantially parallel to the axis (2) of the traction element (1).

* * * * *